United States Patent
Annigeri et al.

(10) Patent No.: US 10,281,022 B2
(45) Date of Patent: May 7, 2019

(54) DIFFERENTIAL ASSEMBLY AND METHOD OF MANUFACTURE

(71) Applicant: ArvinMeritor Technology, LLC, Troy, MI (US)

(72) Inventors: Aniruddh P. Annigeri, Troy, MI (US); Chetankumar Ghatti, Bangalore (IN); Phillip Leicht, South Lyon, MI (US); Yang Zhai, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 264 days.

(21) Appl. No.: 15/350,153

(22) Filed: Nov. 14, 2016

(65) Prior Publication Data

US 2018/0135739 A1    May 17, 2018

(51) Int. Cl.
*F16H 48/40* (2012.01)
*F16H 48/08* (2006.01)
*F16H 48/38* (2012.01)

(52) U.S. Cl.
CPC ............. *F16H 48/40* (2013.01); *F16H 48/08* (2013.01); *F16H 2048/382* (2013.01)

(58) Field of Classification Search
CPC ................................................. F16H 2048/382
See application file for complete search history.

(56) References Cited

U.S. PATENT DOCUMENTS

| 8,015,899 | B2 | 9/2011 | Gianone et al. |
| 8,327,541 | B2 | 12/2012 | Harrup et al. |
| 9,534,680 | B2 * | 1/2017 | Berndt ................... F16H 48/08 |

* cited by examiner

*Primary Examiner* — Derek D Knight
(74) *Attorney, Agent, or Firm* — Brooks Kushman P.C.

(57) ABSTRACT

A differential assembly and a method of manufacture. The differential assembly may include a case that is rotatable about an axis and includes a first case portion and the second case portion. The first case portion may be joined to the second case portion with a first weld that may be disposed at an angle with respect to the axis.

20 Claims, 8 Drawing Sheets

DIFFERENTIAL ASSEMBLY AND METHOD OF MANUFACTURE

TECHNICAL FIELD

This disclosure relates to a differential assembly and a method of manufacturing a differential assembly.

BACKGROUND

A method of assembling a differential mechanism is disclosed in U.S. Pat. No. 8,327,541.

SUMMARY

In at least one embodiment, a method of assembling a differential assembly is provided. The differential assembly may include a ring gear and a case. The case may have a first case portion and a second case portion. The ring gear may be disposed on the first case portion. The second case portion may be disposed on the first case portion and may be partially received inside of the first case portion. The method may include positioning the differential assembly in a first fixture such that the ring gear is disposed on the first fixture. A second fixture may be actuated into engagement with the second case portion to clamp the case to the ring gear. The second fixture may not engage the first case portion and the ring gear. The second case portion may be secured to the first case portion with a first weld. The ring gear may be secured to the first case portion with a second weld.

In at least one embodiment, a differential assembly is provided. The differential assembly may include a case. The case may be rotatable about an axis and may include a first case portion and a second case portion. The first case portion may have a cavity and a mounting flange. The cavity may receive a differential unit. The mounting flange may extend around the cavity and may include an inner surface and an annular mounting lip. The inner surface may be radially disposed around the axis and may partially define the cavity. The annular mounting lip may extend from the inner surface. The annular mounting lip may have a first mating surface. The second case portion may include an inner mounting ring and an outer mounting flange. The inner mounting ring may be received in the cavity and may engage the inner surface of the mounting flange. The outer mounting flange may extend around the inner mounting ring. The outer mounting flange may have a second mating surface. The second mating surface may be disposed on the first mating surface. The first mating surface and the second mating surface may be disposed substantially parallel to each other and may be disposed at an angle that is not parallel and not perpendicular to the axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
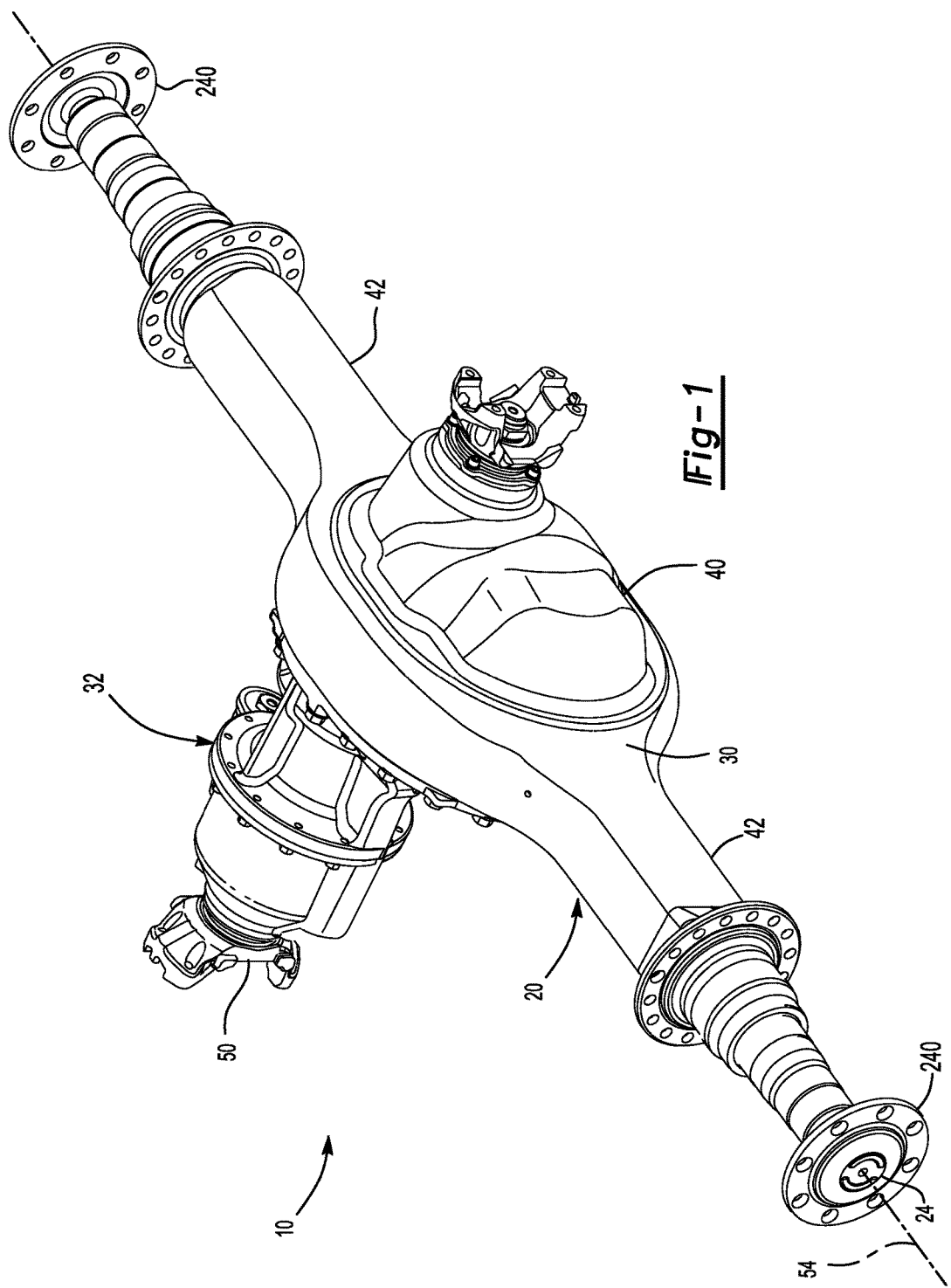
FIG. 1 is a perspective view of an axle assembly that includes a differential carrier that supports a differential assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown with reference to FIGS. 1 and 2, the axle assembly 10 may include a housing assembly 20, a differential assembly 22, and at least one axle shaft 24.

Referring to FIG. 1, the housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

The axle housing 30 may receive and support the axle shafts 24. The axle housing 30 may include a center portion 40 and at least one arm portion 42.

The center portion 40 may be disposed proximate the center of the axle housing 30. The center portion 40 may define a cavity that may receive the differential assembly 22. The center portion 40 may include a carrier mounting surface. The carrier mounting surface may face toward and may engage the differential carrier 32. The carrier mounting surface may facilitate mounting of the differential carrier 32 to the axle housing 30. For example, the carrier mounting surface may have a set of holes that may be aligned with corresponding holes on the differential carrier 32. Each hole may receive a fastener, such as a bolt, that may couple the differential carrier 32 to the axle housing 30.

One or more arm portions 42 may extend from the center portion 40. For example, two arm portions 42 may extend in opposite directions from the center portion 40 and away from the differential assembly 22. The arm portions 42 may have substantially similar configurations. For example, the arm portions 42 may each have a hollow configuration or tubular configuration that may extend around the corresponding axle shaft 24 and may help separate or isolate the axle shaft 24 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity that may receive a corresponding axle shaft 24.

The differential carrier 32, which may also be called a carrier housing, may be mounted to the center portion 40 of the axle housing 30. The differential carrier 32 may support components of the differential assembly 22. For example the differential carrier 32 may have one or more bearing supports that may receive or support a roller bearing assembly that may rotatably support the differential assembly 22.

Figure 2:
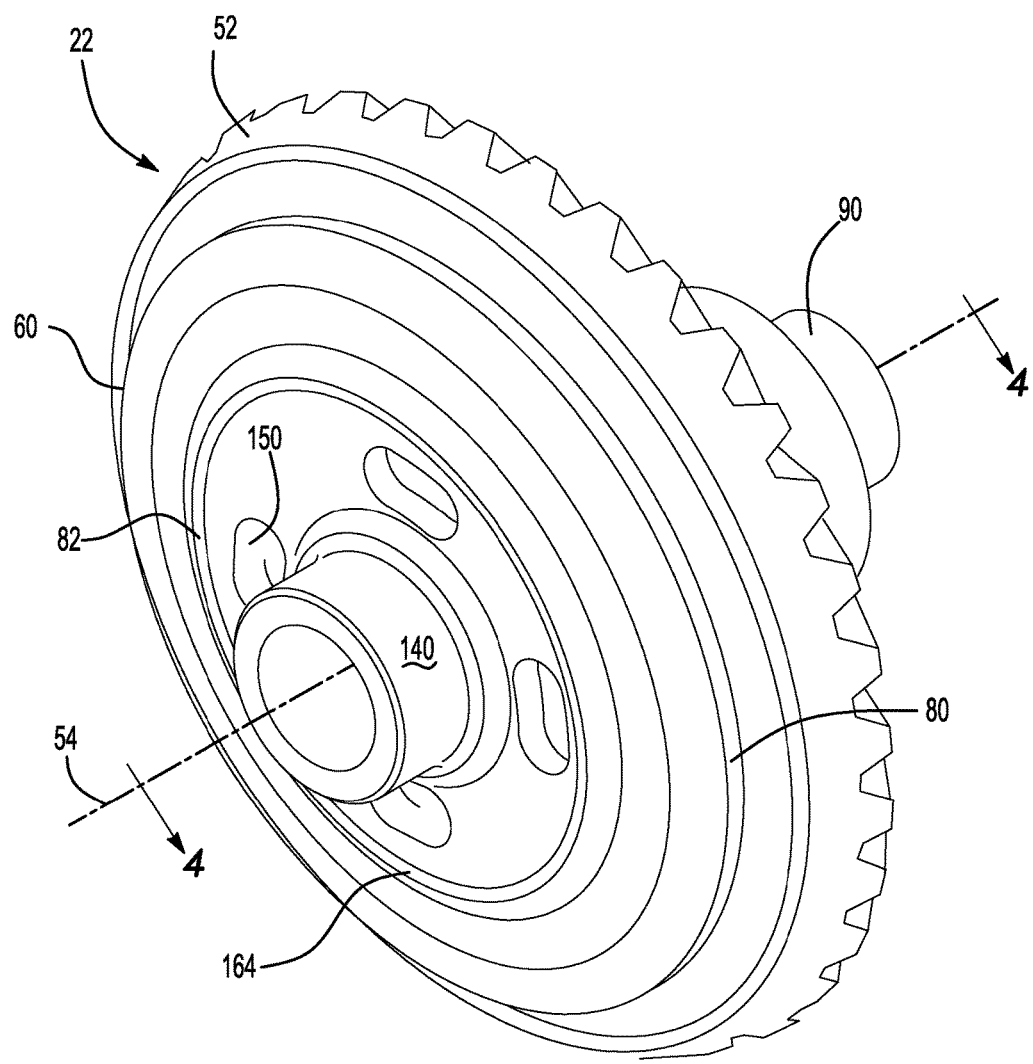
FIG. 2 is a perspective view of the differential assembly.

Referring to FIG. 2, an example of a differential assembly 22 is shown. The differential assembly 22 may be disposed in the center portion 40 of the housing assembly 20. The differential assembly 22 may transmit torque to the vehicle traction wheel assemblies and permit the traction wheel assemblies to rotate at different velocities. An input yoke 50 is shown in FIG. 1 to facilitate an abbreviated discussion of the operation of the axle assembly 10 and the differential assembly 22.

The input yoke 50 may be coupled to a vehicle drivetrain component, such as a drive shaft, that may be coupled to an output of a vehicle transmission or transfer case, which in turn may receive torque from a vehicle power source, such as an engine or motor. Alternatively, the input yoke 50 may be operatively connected to an output of another axle assembly. The input yoke 50 may be connected to or integrally formed with an input shaft that may be rotatably supported by one or more roller bearings that may be disposed on the differential carrier 32. The input shaft may be operatively connected to a drive pinion or may be integrally formed with the drive pinion. The drive pinion may provide torque to a ring gear 52 that may be provided with the differential assembly 22. The ring gear 52 may rotate about an axis 54. The differential assembly 22 may be operatively connected to the axle shafts 24. As such, the differential assembly 22 may receive torque via the ring gear 52 and provide torque to the axle shafts 24.

Figure 3:
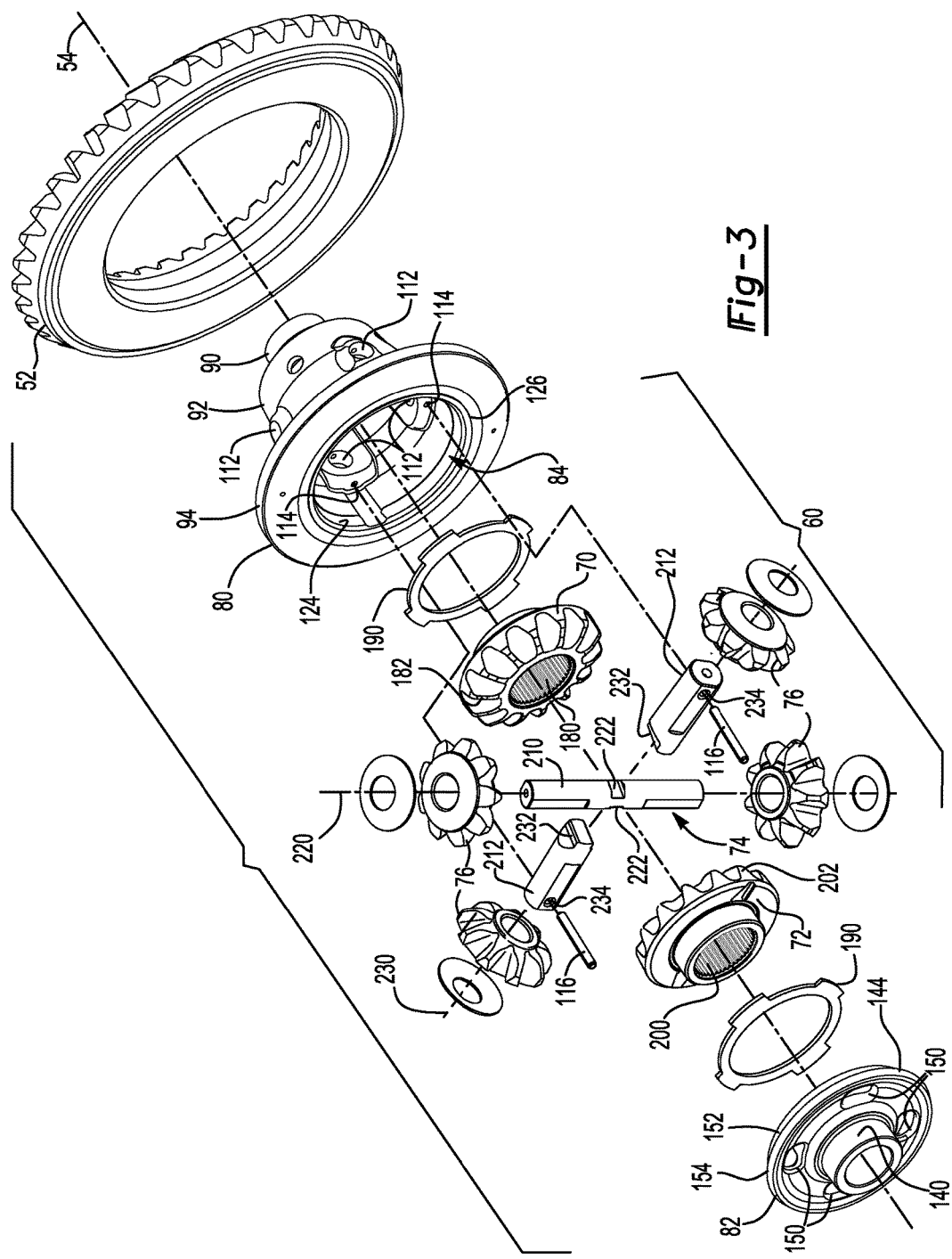
FIG. 3 is an exploded view of the differential assembly.
Figure 4:
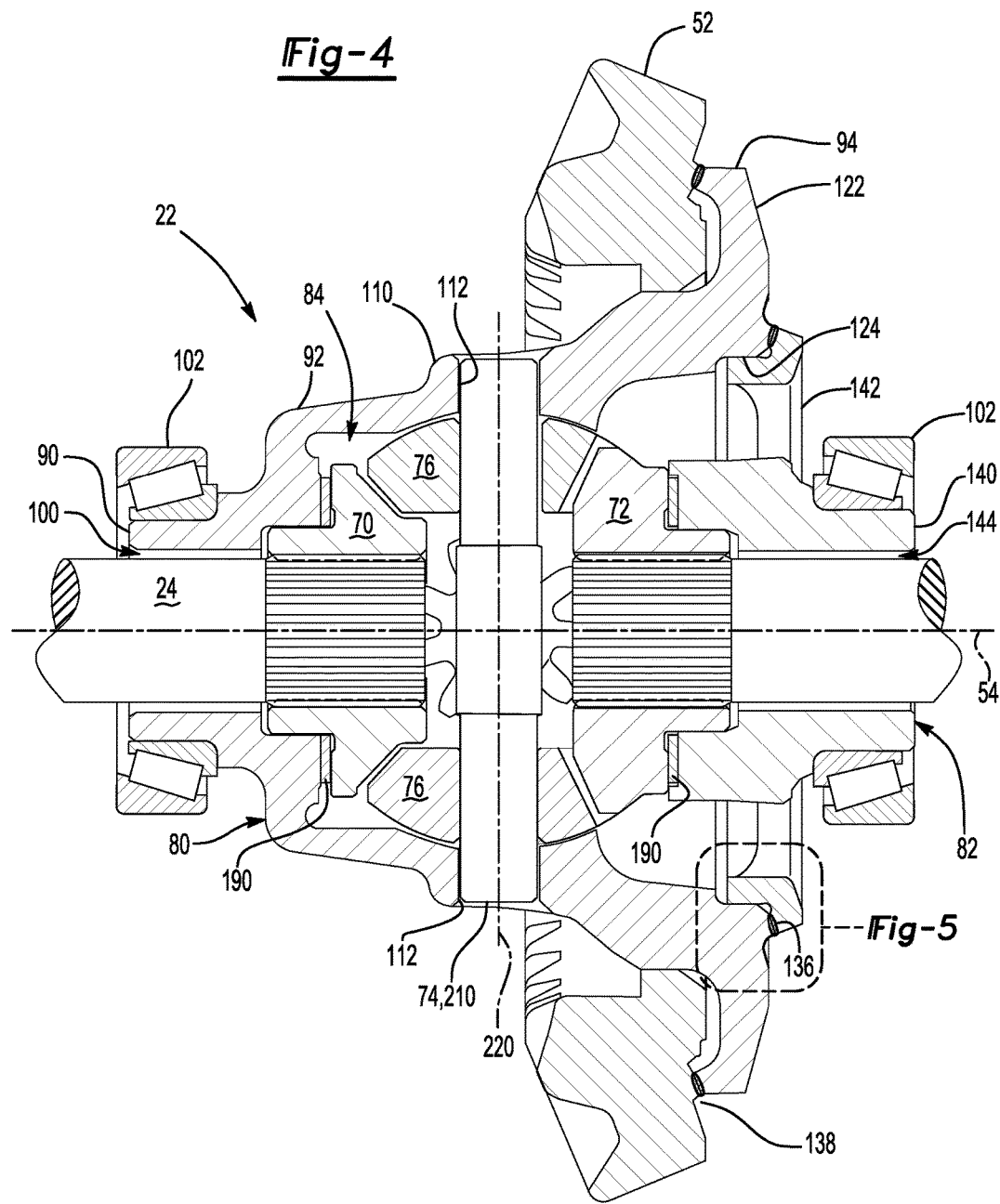
FIG. 4 is a section view of the differential assembly along section line 4-4

Referring to FIGS. 2-4, the differential assembly 22 is shown in more detail. In addition to the ring gear 52, the differential assembly 22 may include a case 60 and a differential unit 62. The differential unit 62 may include a first gear 70, a second gear 72, a spider 74, and at least one pinion gear 76.

The case 60 may be configured to receive components of the differential assembly 22. In addition, the case 60 may be rotatable about the axis 54. In at least one embodiment, the case 60 may include a first case portion 80 and a second case portion 82 that may cooperate to at least partially define a cavity 84. The cavity 84 may at least partially receive the differential unit 62.

Referring to FIGS. 3 and 4, an example of a first case portion 80 is shown. As is best shown beginning with FIG. 3, the first case portion 80 may include a first bearing portion 90, a spider receiving portion 92, and a mounting flange 94.

The first bearing portion 90 may extend around the axis 54. In addition, the first bearing portion 90 may extend around and may at least partially define a first hole 100 through which an axle shaft 24 may extend. As best shown in FIG. 4, the first bearing portion 90 may be disposed proximate and may engage a roller bearing assembly 102 that may rotatably support the first case portion 80. The roller bearing assembly 102 may be mounted to a bearing support of the differential carrier 32.

Referring to FIGS. 3 and 4, the spider receiving portion 92 may extend between the first bearing portion 90 and the mounting flange 94. As is best shown in FIG. 3, the spider receiving portion 92 may extend around and may at least partially define the cavity 84. In at least one configuration, the spider receiving portion 92 may have an exterior surface 110, at least one spider shaft hole 112, and at least one retainer pin hole 114.

The exterior surface 110 may be an exterior surface of the spider receiving portion 92 that may face away from the cavity 84. The exterior surface 110 may extend around the axis 54 and around at least a portion of the cavity 84.

One or more spider shaft holes 112 may be provided in the spider receiving portion 92. A spider shaft hole 112 may receive a shaft of the spider 74 as will be discussed in more detail below. In FIG. 3, four spider shaft holes 112 are shown; however, it is contemplated that a greater or lesser number of spider shaft holes 112 may be provided. The spider shaft holes 112 may be spaced apart from each other and may be arranged around the axis 54. For example, spider shaft holes 112 may be disposed along axes that may be disposed substantially perpendicular to the axis 54. The spider shaft holes 112 may be through holes that may be completely defined in the first case portion 80. For example, spider shaft holes 112 may extend from the cavity 84 to the exterior surface 110. In addition, the spider shaft holes 112 may be axially positioned between the first bearing portion 90 and the mounting flange 94.

Referring to FIG. 3, one or more retainer pin holes 114 may be provided with the first case portion 80. A retainer pin hole 114 may receive a retainer pin 116 that may couple or secure at least a portion of the spider 74 to the first case portion 80. In FIG. 3, two retainer pin holes 114 are shown that are disposed directly opposite each other; however, it is contemplated that a greater or lesser number of retainer pin holes 114 may be provided and that each retainer pin hole 114 need not be disposed directly opposite another retainer pin hole 114. Each retainer pin hole 114 may extend to spider shaft hole 112. In addition, the retainer pin hole 114 may extend through the spider shaft hole 112 such that a portion of the retainer pin hole 114 extends in an axial direction from the spider shaft hole 112 toward the first bearing portion 90, thereby permitting the retainer pin 116 to be inserted completely through a shaft of the spider 74.

Referring to FIGS. 2-4, the mounting flange 94 may be disposed at an opposite end of the first case portion 80 from the first bearing portion 90. The mounting flange 94 may extend from the spider receiving portion 92. For example, the mounting flange 94 may extend away from the axis 54 and may extend further away from the axis 54 than the first bearing portion 90 and the spider receiving portion 92. The mounting flange 94 may extend continuously around the axis 54 and the cavity 84. The mounting flange 94 may facilitate mounting of the ring gear 52. As is best shown in FIG. 4, the ring gear 52 may be disposed on the mounting flange 94 and may be oriented such that the teeth of the ring gear 52 extend away from the second case portion 82. The ring gear 52 may be attached to the mounting flange 94 with a first weld as will be discussed in more detail below. In at least one configuration, the mounting flange 94 may include a first mounting flange side 120, a second mounting flange side 122, an inner surface 124, an annular mounting lip 126, and an annular mounting flange groove 128.

The first mounting flange side 120 may face toward and may engage the ring gear 52.

The second mounting flange side 122 may be disposed opposite the first mounting flange side 120.

The inner surface 124 may face toward the axis 54 and may at least partially define the cavity 84. The inner surface 124 may be radially disposed around the axis 54 and may be disposed at a substantially constant radial distance from the axis 54.

Figure 5:
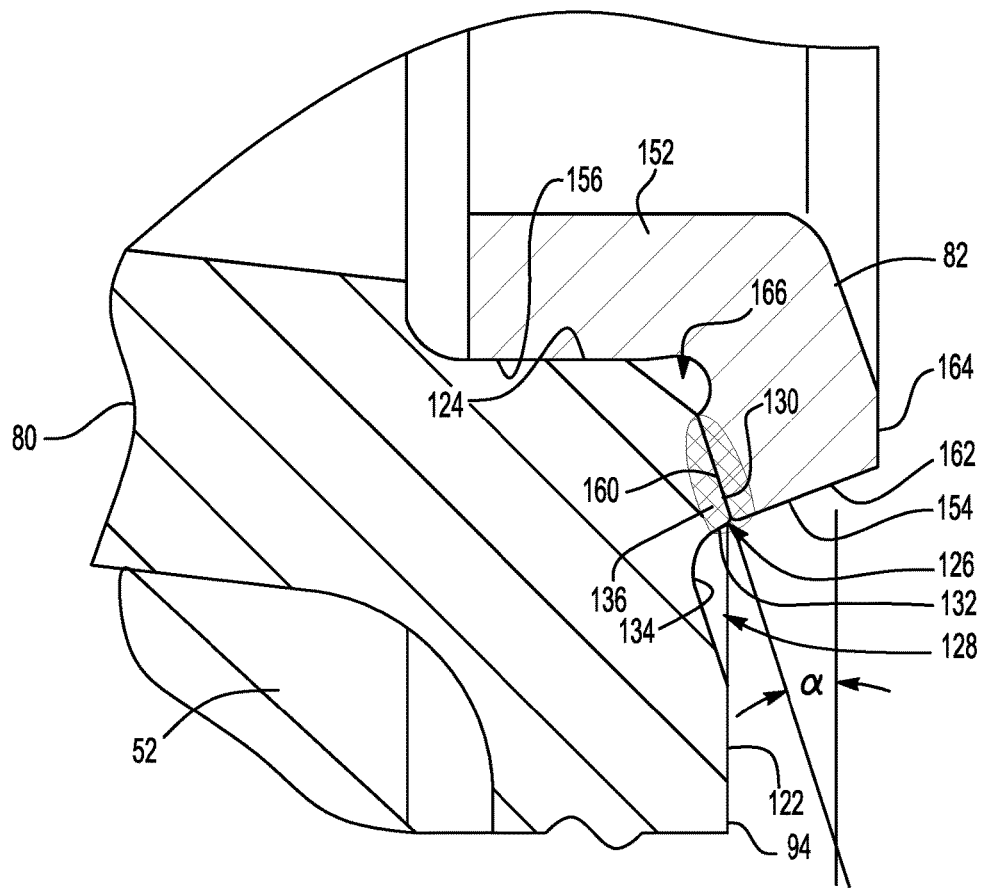
FIG. 5 is a magnified view of a portion of the differential assembly.

Referring to FIGS. 4 and 5, the annular mounting lip 126 may protrude from the second mounting flange side 122. The annular mounting lip 126 may extend continuously around the axis 54 and may extend from the inner surface 124 in a direction that extends away from the axis 54. The annular mounting lip 126 may have a first mating surface 130 and an outer annular mounting lip surface 132.

Referring to FIG. 5, the first mating surface 130 may engage the second case portion 82 as will be discussed in more detail below. The first mating surface 130 may extend continuously around the axis 54 and may be oriented at an angle with respect to the axis 54 and the inner surface 124. More specifically, the first mating surface 130 may be disposed at an acute angle α with respect to the axis 54 that is neither perpendicular nor parallel to the axis 54. As such, the first mating surface 130 may have a tapered conical configuration or a generally frusto-conical shape with a linear cross section.

The outer annular mounting lip surface 132 may extend from an end of the first mating surface 130. More specifically the outer annular mounting lip surface 132 may face away from the axis 54 and may extend around at least a portion of the first mating surface 130. The outer annular mounting lip surface 132 may be disposed substantially perpendicular to the first mating surface 130 in one or more embodiments. As such, the outer annular mounting lip surface 132 may not be disposed parallel or perpendicular to the axis 54. In addition, the outer annular mounting lip surface 132 may be aligned with a corresponding surface of the second case portion 82 to provide a level surface for providing a weld as will be discussed in more detail below.

The annular mounting flange groove 128 may extend into the second mounting flange side 122. More specifically, the annular mounting flange groove 128 may be configured as a recess that may extend toward the first mounting flange side 120. The annular mounting flange groove 128 may extend continuously around the axis 54 and may extend around the annular mounting lip 126. As such, the annular mounting flange groove 128 may extend outwardly from the outer annular mounting lip surface 132 or may be disposed further from the axis than the outer annular mounting lip surface 132. The annular mounting flange groove 128 may be partially defined by the outer annular mounting lip surface 132 and a groove bottom surface 134 that may extend outwardly from the outer annular mounting lip surface 132. The groove bottom surface 134 may extend from the outer annular mounting lip surface 132 to an adjacent portion of the second mounting flange side 122.

Referring to FIGS. 2-5, the second case portion 82 may be mounted on the first case portion 80. The second case portion 82 may be fixedly disposed at an end of the first case portion 80 with a first weld 136 such that the second case portion 82 does not rotate with respect to the first case portion 80. The ring gear 52 may be joined to the first case portion 80 with a second weld 138 that may be separate from the first weld 136. In at least one configuration, the second case portion 82 may include a second bearing portion 140 and a second mounting portion 142.

Referring to FIGS. 3 and 4, the second bearing portion 140 may extend around the axis 54 and may extend around or define a hole 144 that may receive an axle shaft 24 and a portion of the second gear 72. As is best shown in FIG. 4, a roller bearing assembly 102 that rotatably supports the second case portion 82 may be disposed on the second bearing portion 140. The roller bearing assembly 102 may be mounted to a bearing support of the differential carrier 32.

The second mounting portion 142 may extend from the second bearing portion 140 to the first case portion 80. More specifically, the second mounting portion 142 may extend outwardly from the second bearing portion 140 in a direction that extends away from the axis 54. The second mounting portion 142 may include one or more openings 150, an inner mounting ring 152, and an outer mounting flange 154.

One or more openings 150 may extend through the second mounting portion 142. The openings 150 facilitate the flow of lubricant to the differential unit 62 and may help reduce weight.

The inner mounting ring 152 may be received in the cavity 84 and may be disposed between the openings 150 and the mounting flange 94. The inner mounting ring 152 may extend away from the second bearing portion 140 and may engage the inner surface 124 of the mounting flange 94. More specifically, the inner mounting ring 152 may have an exterior surface 156 that may face away from the axis 54 and may engage the inner surface 124.

Referring to FIGS. 4 and 5, the outer mounting flange 154 may extend around the inner mounting ring 152. More specifically, the outer mounting flange 154 may extend outwardly from the inner mounting ring 152 in a direction that extends away from the axis 54. In at least one configuration, the outer mounting flange 154 may have a second mating surface 160, an external surface 162, and an end surface 164.

Referring to FIG. 5, the second mating surface 160 may engage the first mating surface 130. The second mating surface 160 may extend continuously around the axis 54 and may be disposed parallel or substantially parallel to the first mating surface 130. As such, the second mating surface 160 may be oriented at an acute angle α with respect to the axis 54 that is neither perpendicular nor parallel to the axis 54. The second mating surface 160 may have a tapered conical configuration or a generally frusto-conical shape with a linear cross section.

The external surface 162 may extend from an end of the second mating surface 160. More specifically, the external surface 162 may face away from the axis 54 and may extend from an end of the second mating surface 160 to the end surface 164. The external surface 162 may be disposed substantially perpendicular to the second mating surface 160 in one or more embodiments. As such, the external surface 162 may not be disposed parallel or perpendicular to the axis 54. In addition, the external surface 162 may be aligned with and may be disposed parallel to the outer annular mounting lip surface 132 to provide a level surface for providing a weld.

The end surface 164 may be disposed at an end of the outer mounting flange 154. The end surface 164 may be disposed opposite the second mating surface 160 and may be disposed substantially perpendicular to the axis 54.

Referring to FIG. 5, an annular gap 166 may be disposed between the inner mounting ring 152 and the outer mounting flange 154. The annular gap 166 may be partially or completely defined by the second case portion 82. For example, the annular gap 166 may be disposed between the inner mounting ring 152 and an outer mounting flange 154 and may be configured as a groove or undercut that may extend from the exterior surface 156 to the second mating surface 160. Accordingly, the annular gap 166 may be located between the first case portion 80 and the second case portion 82 at an end of the first mating surface 130 and the second mating surface 160.

Referring to FIGS. 3 and 4, the first gear 70 may be disposed in the first case portion 80. For example, the first gear 70 may be at least partially disposed in the first hole 100 and may be configured to rotate about the axis 54. As is best shown in FIG. 4, the first gear 70 may include a first gear hole 180 and a first gear portion 182.

The first gear hole 180 may be disposed along the axis 54 and may receive an axle shaft 24. The first gear hole 180 may have a spline that may mate with a corresponding spline on the first axle shaft 24 such that the first gear 70 may not rotate with respect to the first axle shaft 24.

The first gear portion 182 may face toward and may be spaced apart from the spider 74. The first gear portion 182 may have a set of teeth that may be arranged around the axis 54 and that may mate with teeth on one or more pinion gears 76. A thrust washer 190 or bearing may be disposed between the first gear portion 182 and the first case portion 80.

The second gear 72 may be disposed in the cavity 84 opposite the first gear 70 and may be configured to rotate about the axis 54. The second gear 72 may be spaced apart from the first gear 70 and may have a similar or identical configuration as the first gear 70. In at least one embodiment, the second gear 72 may include a second gear hole 200 and a gear portion 202.

The second gear hole 200 may be disposed along the axis 54 and may receive a second axle shaft 24. The second gear hole 200 may have a spline that may mate with a corresponding spline on the second axle shaft 24 such that the second gear 72 may not rotate with respect to the second axle shaft 24.

The gear portion 202 may face toward and may be spaced apart from the spider 74. The gear portion 202 may have a set of teeth that may be arranged around the axis 54 and that may mate with teeth on one or more pinion gears 76. A thrust washer 190 or bearing may be disposed between the gear portion 202 and the second case portion 82.

Referring to FIGS. 3 and 4, the spider 74 may rotate about the axis 54 with the case 60. In at least one embodiment, the spider 74 may include a primary spider shaft 210 and at least one secondary spider shaft 212.

The primary spider shaft 210 may be mounted to the first case portion 80. For example, the primary spider shaft 210 may have opposing ends that may be received in corresponding spider shaft holes 112 of the first case portion 80. As such, the primary spider shaft 210 may extend across the cavity 84 and may extend through the axis 54. In addition, the primary spider shaft 210 may be spaced apart from and may not engage the second case portion 82. The primary spider shaft 210 may be disposed along a primary spider shaft axis 220. The primary spider shaft axis 220 may intersect and may be disposed substantially perpendicular to the axis 54. As is best shown in FIG. 3, the primary spider shaft 210 may have a generally cylindrical configuration and may include one or more notches 222. A notch 222 may receive and facilitate positioning of a secondary spider shaft 212 with respect to the primary spider shaft 210.

Referring to FIGS. 3 and 4, one or more secondary spider shafts 212 may be mounted to the first case portion 80. The secondary spider shaft 212 may extend from a spider shaft hole 112 to the primary spider shaft 210. For example, the secondary spider shaft 212 may have a first end that may be received in the notch 222 of the primary spider shaft 210 and a second end that may be disposed opposite the first end and may be received in a corresponding spider shaft hole 112. In addition, the secondary spider shaft 212 may be spaced apart from and may not engage the second case portion 82.

The secondary spider shaft 212 may be disposed along a secondary spider shaft axis 230. The secondary spider shaft axis 230 may intersect and may be disposed substantially perpendicular to the axis 54 and the primary spider shaft axis 220. In addition, the primary spider shaft axis 220 and secondary spider shaft axis 230 may be substantially coplanar or disposed in a common plane. In the configuration shown, two secondary spider shafts 212 are provided that are disposed on opposite sides of the primary spider shaft 210 and are coaxially disposed along the secondary spider shaft axis 230. The secondary spider shafts 212 may have common or substantially identical configurations that may include a tapered end 232 and a retainer pin receiving hole 234.

The tapered end 232 may be received in a notch 222 of the primary spider shaft 210. The secondary spider shaft 212 and its tapered end 232 may not be fixedly attached to the primary spider shaft 210.

Referring to FIG. 3, the secondary spider shaft 212 may have a retainer pin receiving hole 234 that may receive the retainer pin 116. The retainer pin receiving hole 234 may be disposed near the second end of the secondary spider shaft 212 and may be aligned with a corresponding retainer pin hole 114 in the first case portion 80. The retainer pin 116 may be received in a retainer pin hole 114 and may extend through a corresponding retainer pin receiving hole 234 in a spider shaft to couple a spider shaft to the first case portion 80 to inhibit movement of the spider shaft away from the axis 54.

Referring to FIGS. 3 and 4, a pinion gear 76 may be rotatably disposed on the primary spider shaft 210 and the secondary spider shafts 212. For instance, two pinion gears 76 may be disposed on the primary spider shaft 210 while a single pinion gear 76 may be disposed on each secondary spider shaft 212. Each pinion gear 76 may be disposed in the cavity 84 of the case 60 and may be rotatably supported or retained on a corresponding spider shaft with one or more fasteners, such as a washer and/or a thrust bearing. The pinion gears 76 on the primary spider shaft 210 may rotate about the primary spider shaft axis 220. The pinion gear 76 on the secondary spider shaft 212 may rotate about the secondary spider shaft axis 230. Each pinion gear 76 may include a set of teeth that mate with teeth on the first gear 70 and teeth on the second gear 72.

Referring to FIGS. 1 and 4, the axle shafts 24 may transmit torque from the differential assembly 22 to corresponding traction wheel assemblies. Each axle shaft 24 may extend through a different arm portion 42 of axle housing 30. The axle shafts 24 may extend along and may be rotated about the axis 54 by the differential assembly 22. Each axle shaft 24 may have a first end and a second end. The first end may be coupled to the differential assembly 22. The second end may be disposed opposite the first end and may be operatively connected to a wheel end assembly that may have a wheel hub that may support a wheel. As shown in FIG. 1, an axle flange 240 may be disposed proximate the second end of the axle shaft 24 and may facilitate coupling of the axle shaft 24 to the wheel hub.

Figure 6:
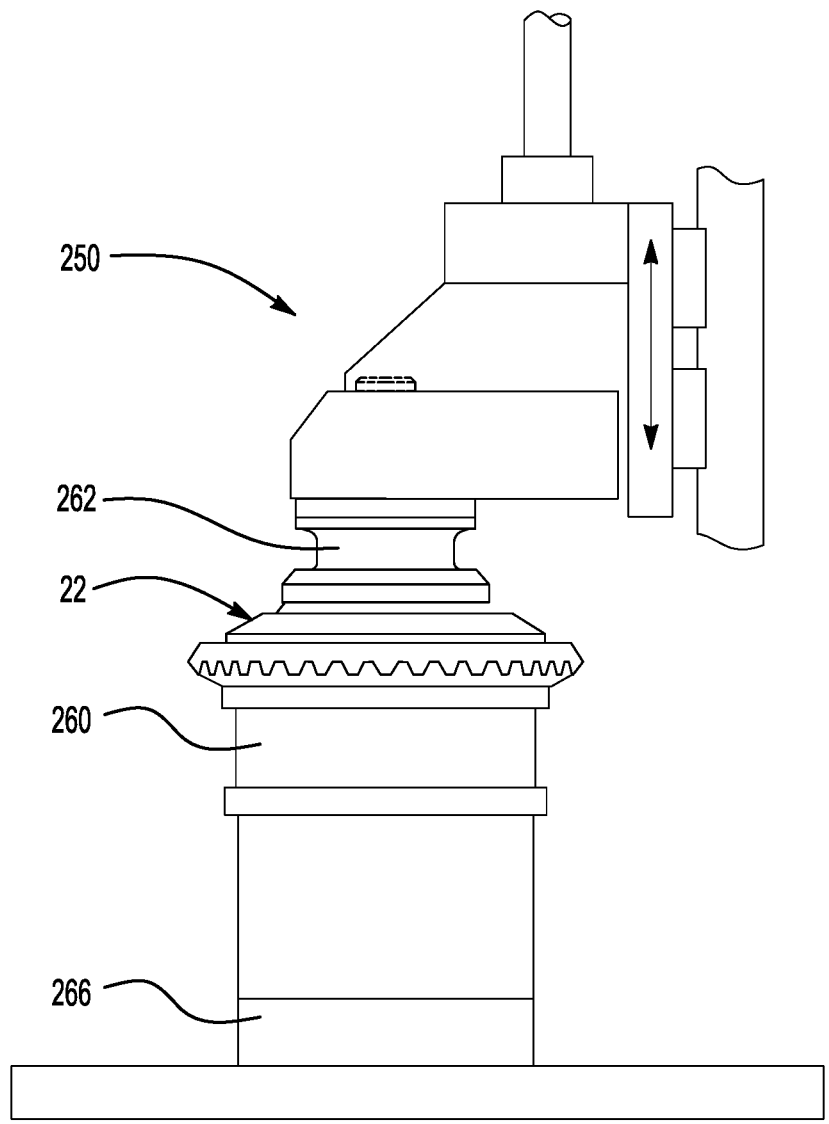
FIG. 6 is a perspective view of a welding unit that receives and welds the differential assembly.
Figure 7:
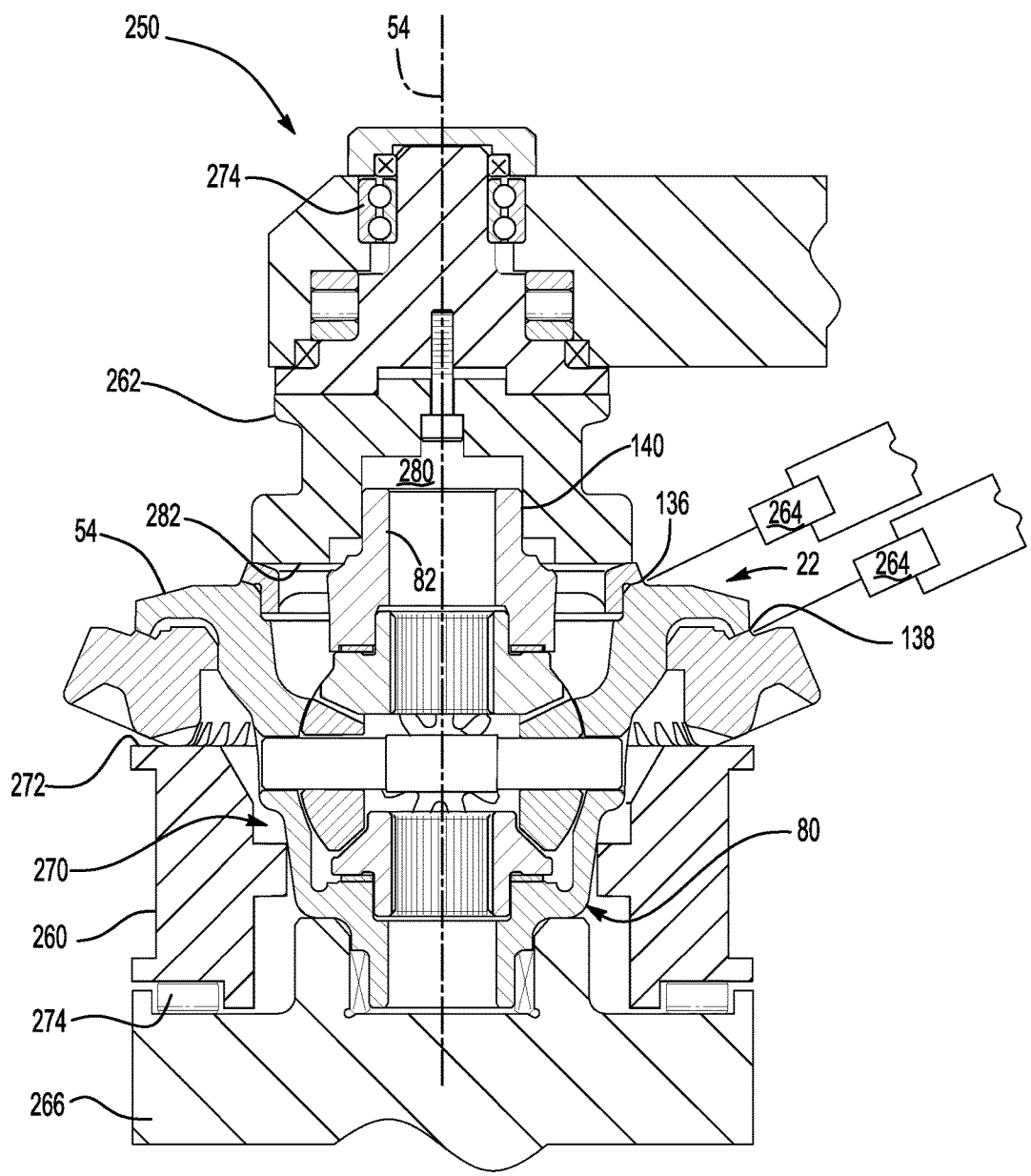
FIG. 7 is a section view of the welding unit and the differential assembly along an axis of the differential assembly.

The differential assembly 22 may be assembled using a welding unit 250 such as is shown in FIGS. 6 and 7. The welding unit 250 may include a first fixture 260, a second fixture 262, at least one laser welder 264, and a press 266.

The first fixture 260 may be disposed on a support surface, such as the bed of the press 266. The first fixture 260 may be generally ring shaped and may include a first fixture cavity 270 and a support surface 272.

The first fixture cavity 270 may receive a portion of the differential assembly 22, such as the first case portion 80. The first fixture cavity 270 may not receive the ring gear 52.

The support surface 272 may face toward the second fixture 262 and may extend around the first fixture cavity 270. The support surface 272 may support the ring gear 52 of the differential assembly 22. The first fixture 260 may be rotatable about the axis 54. For example, the first fixture 260 may be disposed on one or more bearings 274 that may facilitate rotation of the first fixture 260 with respect to the bed of the press 266.

The second fixture 262 may be movable with respect to the first fixture 260. For example, the second fixture 262 may be fixedly disposed on an upper portion of the press 266 that may be movable with respect to the bed of the press 266. The upper portion of the press 266 may actuate or move the second fixture 262 in a linear manner toward and away from the first fixture 260. The second fixture 262 may be generally ring shaped and may include a second fixture cavity 280 and a contact surface 282. The second fixture 262 may be rotatable about the axis 54. For example, the second fixture 262 may be disposed on one or more bearings 274 that may facilitate rotation of the second fixture 262. An actuator like a motor may be operatively coupled to the first fixture 260 and/or the second fixture 262 to rotate the first fixture 260 and the second fixture 262 about the axis 54.

The second fixture cavity 280 may receive a portion of the differential assembly 22, such as the second bearing portion 140 of the second case portion 82. The second fixture 262 may have a smaller diameter than the first fixture 260, the first fixture cavity 270, or both. The second fixture 262 may be sized to engage the second case portion 82 but may not extend to or engage the first case portion 80 and the ring gear 52. Such a configuration may position the locations to be welded outside of the first fixture 260 and the second fixture 262 to permit external access by the laser welder 264.

The contact surface 282 may face toward the first fixture cavity 270 and may extend around the second fixture cavity 280. The contact surface 282 may face toward and engage a surface of the second case portion 82, such as the end surface 164, when the second fixture 262 is actuated toward the first fixture 260. The contact surface 282 may be disposed substantially perpendicular to the axis 54 in one or more embodiments.

One or more laser welders 264 may be provided to weld the differential assembly 22. More specifically, a laser welder 264 may output a laser beam that is focused at the surfaces to be welded. The laser beam heats and melts a region of the parts being joined, typically without a filler metal. Two main welds may be provided to weld the differential assembly 22. The first weld 136 may join the first case portion 80 to the second case portion 82. The second weld 138 may join the ring gear 52 to the first case portion 80. The first weld 136 and the second weld 138 may be executed by different dedicated laser welders 264 or a single moveable laser welder 264. For example, a single laser welder 264 may be mounted on a robotic manipulator that may move the laser welder 264 to the locations suitable to execute the first weld 136 and the second weld 138. The laser welder 264 may be of any suitable type, such as a $CO_2$ laser or solid state neodymium-yttrium-aluminum-garnet (Nd-YAG) laser.

Figure 8:
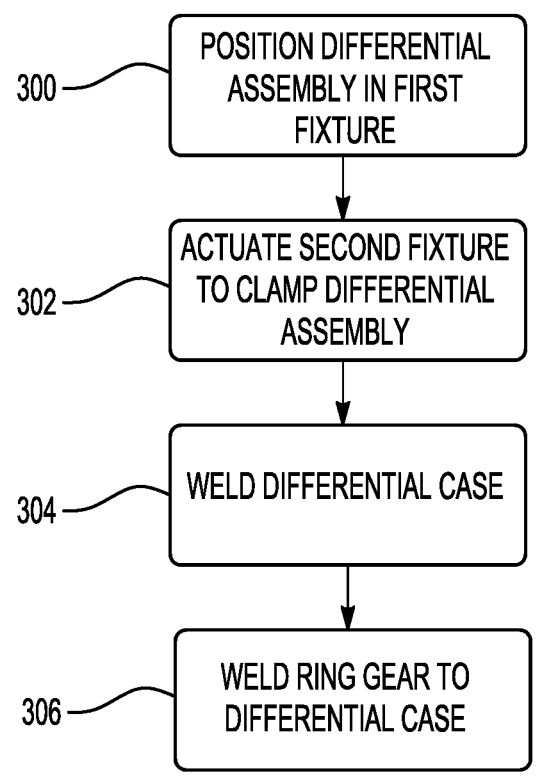
FIG. 8 is a flowchart of a method of assembling the differential assembly.

Referring to FIG. 8, a flowchart of a method of assembling a differential assembly 22 is shown.

At block 300, the differential assembly 22 may be positioned in the first fixture 260. For example, the press 266 may be opened to position the second fixture 262 away from the first fixture 260, thereby providing access to the first fixture cavity 270. The differential assembly 22 may be inserted into the first fixture cavity 270 such that the first case portion 80 may be received in the first fixture cavity 270 and the ring gear 52 may be disposed on the support surface 272.

At block 302, the press 266 may actuate the second fixture 262 to clamp the differential assembly 22. The press 266 may move the second fixture 262 toward the first fixture 260 such that the contact surface 282 may engage the end surface 164 of the second case portion 82. The second fixture cavity 280 may receive the second bearing portion 140 when the second fixture 262 is actuated into engagement with the second case portion 82. The press 266 may cooperate with the first fixture 260 and the second fixture 262 to exert a clamping force on the differential assembly 22 that may hold the ring gear 52 and second case portion 82 under a compressive load against the first case portion 80. The compressive load exerted by the second fixture 262 may pass through the second case portion 82 to the first case portion 80 and from the first case portion 80 to the ring gear 52 rather than by directly exerting force on the first case portion 80. The second fixture 262 may not engage or overlap the first case portion 80 of the ring gear 52 to provide sufficient clearance to execute at least one weld with the laser welder 264.

At block 304, the case 60 of the differential assembly 22 may be welded. The first weld 136 may be executed by positioning the laser welder 264 such that the laser beam from the laser welder 264 is disposed at an angle with respect to the axis 54 and is aligned with or disposed substantially parallel to the first mating surface 130 and the second mating surface 160. As such, the first weld 136 may extend along the first mating surface 130 and the second mating surface 160 and be disposed at a nonparallel and non-perpendicular angle with respect to the axis 54. The first weld 136 may be executed by providing relative motion between the differential assembly 22 and the laser welder 264. For example, the laser welder 264 may be held in a stationary position while the first fixture 260, second fixture 262, and the differential assembly 22 are rotated about the axis 54. Alternatively, the differential assembly 22 may be held in a stationary position while the laser welder 264 is rotated around the axis 54 and the differential assembly 22. As another option, the differential assembly 22 and the laser welder 264 may be rotated simultaneously in opposite directions. The differential assembly 22 and/or the laser welder 264 may be moved or rotated to provide relative movement of one revolution or 360° so that the first weld 136 may extend continuously around the differential assembly 22.

The first weld 136 may have a depth that may extend from the ends of the first and second mating surfaces 130, 160 that are disposed furthest away from the axis 54 to or toward the annular gap 166. For example, the first weld 136 may terminate at the annular gap 166 to reduce stress concentration.

The first weld 136 may be spaced apart from the bottom of the annular mounting flange groove 128. As such, the heat affected zone created by the first weld 136 may extend partially along the outer annular mounting lip surface 132, but may not extend to the groove bottom surface 134 to help avoid stress concentration and potential cracking of the first case portion 80 proximate the edge of the first weld 136.

The second weld 138 may be executed in a similar manner as the first weld 136. The second weld 138 may be provided using another laser welder or by using the same laser welder that is used to execute the first weld 136. If a single laser welder 264 is employed, the first weld 136 may be executed before the second weld 138 or vice versa. Like the first weld 136, the second weld 138 may be provided at an angle with respect to the axis 54 such that the second weld 138 is oriented to extend in a direction that is not disposed parallel or perpendicular to the axis 54. The second weld 138 may be disposed substantially parallel to the first weld 136 in one or more embodiments.

Providing the first and second welds at an angle may allow the first and second welds to be executed in the same fixtures without transferring the differential assembly to other fixtures or presses, thereby reducing material handling, manufacturing time, and the likelihood of part misalignment. In addition, providing angular welds may allow a greater weld diameter and greater weld length to be provided as compared to welds that may be perpendicular or parallel to the axis, thereby providing a stronger and more durable differential assembly. In addition, the angular weld configuration may allow gaps to be provided at the end of a weld and additional clearance to be provided around the weld to help reduce the likelihood of brittle cracking or failures in the welded structure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of assembling a differential assembly, the method comprising:
    positioning the differential assembly in a first fixture, the differential assembly including:
        a ring gear that is disposed on the first fixture; and
        a case that has a first case portion that is disposed on the ring gear and a second case portion that is disposed on the first case portion and received inside the first case portion;
    actuating a second fixture into engagement with the second case portion to clamp the case to the ring gear, wherein the second fixture does not engage the first case portion and the ring gear;
    securing the second case portion to the first case portion with a first weld; and
    securing the ring gear to the first case portion with a second weld.

2. The method of claim 1 wherein the second case portion has an inner mounting ring that is received in the first case portion and an outer mounting flange that extends around the inner mounting ring, wherein the outer mounting flange has an end surface that is disposed at an end of the second case portion, wherein the second fixture engages the end surface.

3. The method of claim 2 wherein the case extends around an axis, the first case portion has a first mating surface, and the second case portion has a second mating surface that engages the first mating surface, wherein the first mating surface and the second mating surface are disposed substantially parallel to each other and are disposed at an angle that is nonparallel and non-perpendicular to the axis.

4. The method of claim 3 wherein the first weld is provided where the first mating surface meets the second mating surface and the first weld is disposed at a nonparallel and non-perpendicular angle with respect to the axis.

5. The method of claim 4 wherein the first weld is disposed substantially parallel to the second weld and the first weld does not engage the second weld.

6. The method of claim 4 wherein the second case portion has an annular gap disposed between the inner mounting ring and the outer mounting flange, wherein the first weld extends to the annular gap.

7. The method of claim 4 wherein the second fixture is actuated along the axis to engage the second fixture to the second case portion.

8. The method of claim 7 wherein the outer mounting flange has an external surface that faces away from the axis, wherein the external surface is disposed further from the axis than the second fixture.

9. The method of claim 8 wherein the external surface extends from the second mating surface and is disposed substantially perpendicular to the second mating surface.

10. A differential assembly comprising:
    a case that is rotatable about an axis and includes:
        a first case portion that has a cavity that receives a differential unit and a mounting flange that extends around the cavity, wherein the mounting flange has an inner surface that is radially disposed around the axis and that partially defines the cavity and an annular mounting lip that extends from the inner surface, wherein the annular mounting lip has a first mating surface; and
        a second case portion that has an inner mounting ring that is received in the cavity and that engages the inner surface and an outer mounting flange that extends around the inner mounting ring, wherein the outer mounting flange has a second mating surface that is disposed on the first mating surface, wherein the first mating surface and the second mating surface are disposed substantially parallel to each other and are disposed at a nonparallel and non-perpendicular angle with respect to the axis; and
    a first weld that joins the first case portion to the second case portion and is provided where the first mating surface engages the second mating surface, wherein the first weld extends to an annular gap that is disposed between the inner mounting ring and the outer mounting flange.

11. The differential assembly of claim 10 wherein the first weld is disposed at a nonparallel and non-perpendicular angle with respect to the axis.

12. The differential assembly of claim 10 further comprising a ring gear mounted to the first case portion.

13. The differential assembly of claim 10 wherein the annular mounting lip has an outer annular mounting lip surface that extends from an end of the first mating surface to a groove bottom surface and the first weld extends partially along the outer annular mounting lip surface but does not extend to the groove bottom surface.

14. The differential assembly of claim 10 wherein the inner mounting ring has an exterior surface that faces away from the axis and engages the inner surface, wherein the annular gap is at least partially defined by the second case portion and extends from the exterior surface to the second mating surface.

15. The differential assembly of claim 14 wherein the outer mounting flange has an external surface that faces away from the axis, wherein the external surface extends from the second mating surface and is disposed substantially perpendicular to the second mating surface.

16. The differential assembly of claim 15 wherein the outer mounting flange has an end surface that is disposed opposite the second mating surface, wherein the external surface extends from the end surface to the second mating surface.

17. The differential assembly of claim 15 wherein the annular mounting lip further comprises an outer annular mounting lip surface that extends from the first mating surface and is disposed substantially perpendicular to the first mating surface.

18. The differential assembly of claim 17 wherein the outer annular mounting lip surface is disposed parallel to and is aligned with the external surface.

19. The differential assembly of claim 18 wherein the mounting flange includes a first mounting flange side that engages a ring gear, a second mounting flange side that is disposed opposite the first mounting flange side, and an annular mounting flange groove that extends from the second mounting flange side toward the first mounting flange side, wherein the annular mounting flange groove extends around the annular mounting lip.

20. The differential assembly of claim 19 wherein the annular mounting flange groove is partially defined by the outer annular mounting lip surface.

* * * * *